US011225218B2

(12) United States Patent
Kobayashi et al.

(10) Patent No.: US 11,225,218 B2
(45) Date of Patent: Jan. 18, 2022

(54) SIDE AIRBAG DEVICE

(71) Applicants:Yuto Kobayashi, Yokohama (JP);
Makoto Fuma, Yokohama (JP);
Autoliv Development AB, Vårgårda (SE)

(72) Inventors: Yuto Kobayashi, Yokohama (JP);
Makoto Fuma, Yokohama (JP)

(73) Assignee: Autoliv Development AB, Vargarda (SE)

( * ) Notice: Subject to any disclaimer, the term of this patent is extended or adjusted under 35 U.S.C. 154(b) by 488 days.

(21) Appl. No.: 16/330,433

(22) PCT Filed: Aug. 23, 2017

(86) PCT No.: PCT/JP2017/030009
§ 371 (c)(1),
(2) Date: Mar. 5, 2019

(87) PCT Pub. No.: WO2018/047617
PCT Pub. Date: Mar. 15, 2018

(65) Prior Publication Data
US 2021/0323496 A1   Oct. 21, 2021

(30) Foreign Application Priority Data

Sep. 7, 2016 (JP) .............................. JP2016-174398

(51) Int. Cl.
*B60R 21/231* (2011.01)
*B60R 21/2338* (2011.01)
(Continued)

(52) U.S. Cl.
CPC ...... *B60R 21/23138* (2013.01); *B60R 21/207* (2013.01); *B60R 21/2338* (2013.01);
(Continued)

(58) Field of Classification Search
None
See application file for complete search history.

(56) References Cited

U.S. PATENT DOCUMENTS 8,783,712 B2   7/2014   Fukushima et al.
9,126,561 B2   9/2015   Akiyama
(Continued)

FOREIGN PATENT DOCUMENTS

JP   2014031096 A   2/2014
JP   2014084022 A   5/2014
(Continued)

OTHER PUBLICATIONS

International Search Report (in English and Japanese) and Written Opinion (in Japanese) issued in PCT/JP2017/030009, dated Nov. 28, 2017; ISA/JP.

*Primary Examiner* — Faye M Fleming
(74) *Attorney, Agent, or Firm* — Harness, Dickey & Pierce, P.L.C.; Stephen T. Olson

(57) ABSTRACT

A side airbag device includes an airbag 2 and an inflator. The airbag is formed in a bag shape by connecting peripheries of first and second main base cloths and of a vehicle inner side and a vehicle outer side. The airbag is partitioned into a front chamber and a rear chamber by a first partition wall. First inner tethers are provided in the front chamber and connect between a forward vehicle direction end of the front chamber and the first partition wall. Lengths of the first inner tethers and are shorter than a length between a first joint part connecting the first partition wall to the first inner tether and the forward vehicle direction end of the front chamber in the airbag in a front to rear vehicle direction before the airbag is deployed.

24 Claims, 7 Drawing Sheets

(51) Int. Cl.
*B60R 21/207* (2006.01)
*B60R 21/00* (2006.01)

(52) U.S. Cl.
CPC ............... *B60R 2021/0006* (2013.01); *B60R 2021/0018* (2013.01); *B60R 2021/23146* (2013.01); *B60R 2021/23382* (2013.01)

(56) References Cited

U.S. PATENT DOCUMENTS

| | | | | |
|---|---|---|---|---|
| 9,150,185 | B2 * | 10/2015 | Hotta | B60R 21/239 |
| 9,475,450 | B2 * | 10/2016 | Hiraiwa | B60R 21/2346 |
| 9,517,747 | B2 * | 12/2016 | Hotta | B60R 21/2334 |
| 9,598,043 | B2 * | 3/2017 | Kobayashi | B60R 21/207 |
| 10,640,073 | B2 * | 5/2020 | Nukaya | B60R 21/207 |
| 2014/0035264 | A1 | 2/2014 | Fukushima et al. | |
| 2014/0284906 | A1 | 9/2014 | Akiyama | |
| 2015/0367806 | A1 | 12/2015 | Fujiwara | |
| 2015/0367811 | A1 * | 12/2015 | Kobayashi | B60R 21/239 |
| | | | | 280/730.2 |
| 2016/0159310 | A1 | 6/2016 | Kobayashi et al. | |

FOREIGN PATENT DOCUMENTS

| | | | | | |
|---|---|---|---|---|---|
| JP | 2014133462 | A | | 7/2014 | |
| JP | 2014141159 | A | | 8/2014 | |
| JP | 2014162391 | A | | 9/2014 | |
| JP | 2014184852 | A | | 10/2014 | |
| JP | 2014237410 | A | | 12/2014 | |
| JP | 2015189459 | A | * | 11/2015 | ........... B60R 21/207 |
| JP | 2016107887 | A | | 6/2016 | |
| WO | WO-2015020052 | A1 | | 2/2015 | |

* cited by examiner

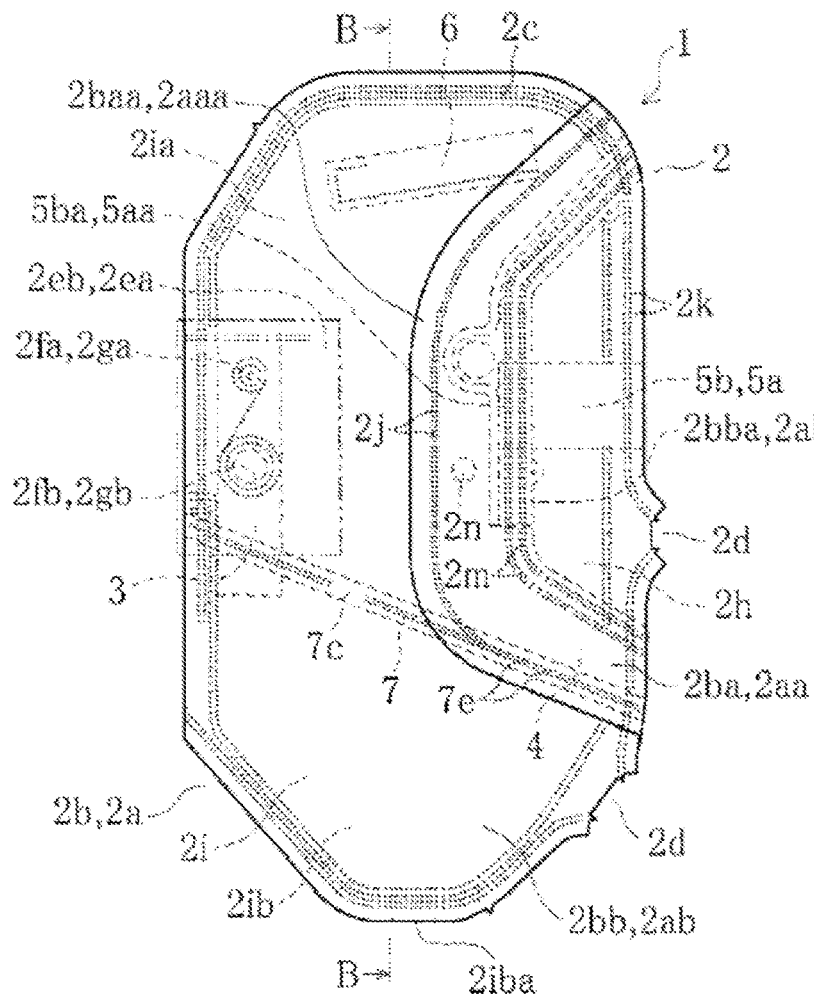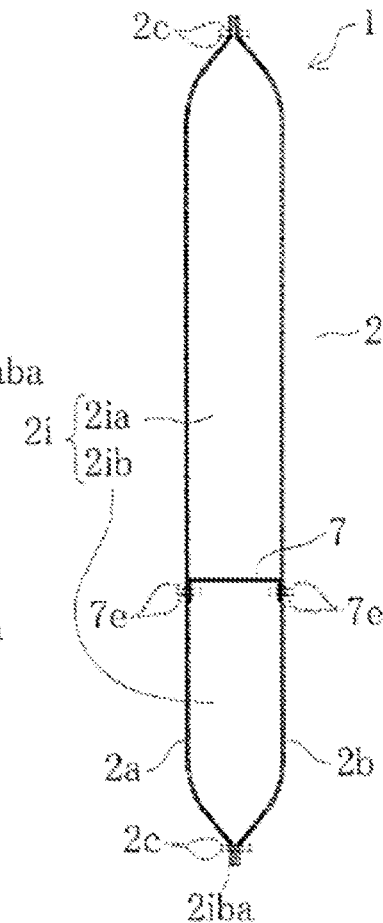
Fig. 7A  Fig. 7B
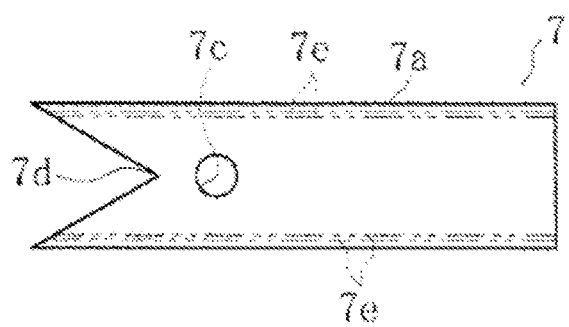
Fig. 8

SIDE AIRBAG DEVICE

CROSS-REFERENCE TO RELATED APPLICATIONS

This application is a 371 U.S. National Stage of International Application No. PCT/JP2017/030009, filed Aug. 23, 2017, which claims priority to Japanese Patent Application No. 2016-174398, filed Sep. 7, 2016. The entire disclosures of the above applications are incorporated herein by reference.

TECHNICAL FIELD

The present invention relates to a side airbag device that is installed in a vehicle so as to protect an occupant in a side collision in which a vehicle is collided from a side surface or in a vehicle roll-over.

In the specification of the present application, "up" and "upward" denote a ceiling side of a vehicle, and "down" and "downward" denote a floor side of the vehicle. Further, "front" and "forward" denote a forward direction side of the vehicle (forward vehicle direction end), and "rear" and "rearward" denote a rearward direction side of the vehicle (rearward vehicle direction end).

BACKGROUND ART

A side airbag device that protects an occupant from an impact in a side collision or in a roll-over is installed, for instance, within a side being opposite to a side door of a backrest part of a seat (referred to as "a seatback" below).

This side airbag device has a configuration in which an inflator generates a gas by receiving an output signal that is transmitted from a sensor that detects an impact in a side collision or in a roll-over so as to deploy an airbag, for instance, between the side door and the seat.

With respect to the above-mentioned side airbag device, the airbag is often divided into a plurality of chambers in consideration of optimization of an area in which the airbag contacts the occupant and easiness of a deployment behavior of the airbag when the airbag is deployed.

For instance, with respect to a side airbag device that is described in Patent Document 1, an airbag is vertically divided by a partition cloth that is formed in a long band shape so as to prevent or suppress an increase of a burden to an abdomen of an occupant by a load from a lower bag part that restrains a waist (loin) of the occupant.

As this side airbag device that is described in Patent Document 1, when the airbag is divided into the plurality of chambers, each part of the occupant can be optimally restrained by adjusting a thickness and an internal pressure of each chamber at the time of the deployment of the airbag.

However, when a size of the above-mentioned partition cloth that divides into the plurality of chambers is changed and the thickness of each chamber at the time of the deployment of the airbag is changed, it is difficult to make a big difference in the thickness of each of the chambers.

It can also be considered that the chamber is upwardly or downwardly folded in an inner side thereof so as to increase the circumference and increase the thickness of the above-mentioned chamber at the time of the deployment of the airbag. However, in this case, the airbag itself is enlarged and a length in a longitudinal (front-back) direction of the airbag is also changed. Therefore, it becomes difficult to control an outer shape of the airbag.

PRIOR ART DOCUMENT

Patent Document

Patent Document 1: Japanese Patent Publication Number 2014-184852.

SUMMARY OF THE INVENTION

Problems to be Solved by the Invention

A problem that the present invention attempts to solve is that with respect to the conventional side airbag device, at the time of the deployment of the airbag, it is difficult to increase a degree of freedom in changing a thickness of each chamber without changing the control performance of the outer shape of the airbag.

Means for Solving the Problems

The present invention attempts to solve the above problems. An object of the present invention is to provide a side airbag device that can increase a degree of freedom in changing a thickness of each chamber at the time of the deployment of an airbag without changing the control performance of the outer shape of the airbag.

Thus, the present invention is a side airbag device that is disposed at an inside of a side of a seatback and that is deployed an area between a side door and the seat or an area between adjacent seats.

The side airbag device includes the airbag and an inflator that is disposed at a rearward direction end of the airbag when the airbag is deployed. The inflator generates a gas by receiving a signal output from a sensor when a side collision or a roll-over occurs and supplies the gas to the airbag in a folded state so as to deploy the airbag.

Further, according to the present invention, the following configurations are the most primary features of the airbag that is formed in a bag shape by connecting a periphery of a main base cloth of a vehicle inner side and a periphery of a main base cloth of a vehicle outer side.

That is, the present invention has a first partition wall and a first inner tether inside the airbag formed in the bag shape. Among these, the first partition wall partitions the inside of the airbag into at least a front chamber located at a forward direction end and a rear chamber located at the rearward direction end at the time of the deployment of the airbag. Further, the first inner tether connects between a forward direction end of the front chamber and the first partition wall in the front chamber.

In addition, a length of the first inner tether is shorter than a length between a first joint part connecting the first partition wall to the first inner tether and the end of the front side of the front chamber in the airbag having a state prior to the deployment of the airbag (before the airbag is deployed) in a front to rear vehicle (longitudinal) direction.

Specifically, an intermediate portion of the first partition wall in a vehicle width direction is provided to protrude toward the front at the time of the deployment of the airbag. An intermediate portion in a vertical (up and down) direction of the first partition wall in the protruded state is the first joint part.

In the present invention, the length of the first inner tether is shorter than the length between the first joint part connecting the first partition wall to the first inner tether and the forward direction end of the front chamber of the airbag having the state prior to the deployment of the airbag in the front to rear direction.

Therefore, when the airbag is deployed, the first joint part that connects between the first partition wall and the first inner tether protrudes toward a front side of the inside of the front chamber. Thus, the control of the outer shape in the longitudinal direction of the airbag can be easily performed. Further, by changing the length of the first inner tether, a thickness of the front chamber at the time of the deployment of the airbag can be changed.

According to the present invention, each of the main base cloths of the vehicle inner side and the vehicle outer side may have a configuration including a first base cloth located at the front side and a second base cloth located at the rear side.

One end of each of the first base cloths at the rear side is located at an outside of an intermediate portion of each of the second base cloths in the longitudinal direction so as to overlap each of the second base cloths, and each of the one ends and each of the intermediate portions are connected (joined) (a second joint part).

Ends of the front side of parts of the second base cloths located at the front side with respect to the second joint part is connected (a third joint part). In this case, an area of the second base cloths located between the second joint part and the third joint part becomes the first partition wall. Further, the third joint part and the end of the front side of the front chamber are connected by the first inner tether.

In this configuration, the front chamber is formed by the first base cloths and the first partition wall, and the rear chamber is formed by the second base cloths.

In the airbag having this configuration, the second base cloths of the vehicle inner side and the vehicle outer side have configurations in which intermediate portions in the vertical direction at the front side recess toward the rear side. The first base cloths of the vehicle inner side and the vehicle outer side have configurations to cover areas of the recessed configurations.

According to the present invention, from the view point that the thickness of the front chamber is uniformized in the vertical direction at the time of the deployment of the airbag, it is preferred that the first inner tether is arranged at the intermediate (middle) portion in the vertical direction of the front chamber.

Further, from the view point that the thickness of the front chamber is formed in line symmetry in the vehicle width direction at the time of the deployment of the airbag, it is preferred that there are at least two first inner tethers.

According to the present invention, it is not limited that the airbag is partitioned into two of the front chamber and the rear chamber. The airbag may have a configuration in which a second partition wall is provided in the rear chamber and the rear chamber is partitioned into an upper rear chamber and a lower rear chamber by this second partition wall. As a result, in the side collision or the roll-over, the occupant protection can be more properly achieved.

In this case, in the lower rear chamber, a second inner tether is provided to connect between an end of a lower side of the lower rear chamber and the second partition wall. Further, a length of the second inner tether is shorter than a length between a fourth joint part connecting the second partition wall to the second inner tether and the end of the lower side of the lower rear chamber in the airbag having a state prior to the deployment of the airbag.

According to the present invention, from the view point that the thickness of the lower rear chamber is uniformized in the longitudinal direction at the time of the deployment of the airbag, it is preferred that the second inner tether is arranged at the intermediate (middle) portion in the longitudinal direction of the lower rear chamber.

Further, from the view point that the thickness of the lower rear chamber is formed in line symmetry in the vehicle width direction at the time of the deployment of the airbag, it is preferred that there are at least two second inner tethers.

According to this configuration, when the airbag is deployed, the control of the outer shape in the vertical direction of the lower rear chamber can be easily performed. Further, by changing the length of the second inner tether, the thickness of the lower rear chamber can be changed.

Effects of the Invention

According to the present invention, when the airbag is deployed, the control of the outer shape in the longitudinal direction of the airbag can be easily performed. Further, by changing the length of the first inner tether, the thickness of the front chamber at the time of the deployment of the airbag can be changed.

Further, when the rear chamber is vertically partitioned by the second partition wall, the length of the second inner tether that connects between the end of the lower side of the lower rear chamber and the second partition wall is specified as follows: That is, the length of the second inner tether is shorter than the length between the fourth joint part connecting the second partition wall to the second inner tether and the end of the lower side of the lower rear chamber in the airbag having the state prior to the deployment of the airbag.

In this configuration, when the airbag is deployed, the control of the outer shape in the vertical direction of the lower rear chamber can be easily performed. Further, by changing the length of the second inner tether, the thickness of the lower rear chamber at the time of the deployment of the airbag can be changed.

BRIEF DESCRIPTION OF THE DRAWINGS

FIG. 1A is a view when viewed from a side surface before an airbag is deployed. FIG. 1B is an enlarged cross-sectional view along the A-A line shown in FIG. 1A after the airbag is deployed.

FIG. 2A is a view that shows main base cloths of a vehicle inner side and a vehicle outer side being developed. FIG. 2B is a view that shows first partition walls. FIG. 2C is a view that shows inner baffles.

FIG. 3A is a view when viewed from a side surface before an airbag is deployed. FIG. 3B is an enlarged cross-sectional view along the A-A line shown in FIG. 3A after the airbag is deployed.

FIG. 4A is a view that shows each second base cloth of the main base cloths of the vehicle inner side and the vehicle outer side being developed. FIG. 4B is a view that shows each first base cloth of the main base cloths of the vehicle inner side and the vehicle outer side.

FIG. 5A is a view when viewed from a side surface before an airbag is deployed. FIG. 5B is an enlarged cross-sectional view along the A-A line shown in FIG. 5A after the airbag is deployed.

FIGS. 7A and 7B are views that show a side airbag device according to a fourth embodiment of the present invention. FIG. 7A is a view when viewed from a side surface before an airbag is deployed. FIG. 7B is an end view along the B-B line shown in FIG. 7A after the airbag is deployed.

FIG. 8 is a view that shows a second example of the second partition wall that is the component of the side airbag device according to the fourth embodiment of the present invention.

FIG. 9A is a view when viewed from a side surface before an airbag is deployed. FIG. 9B is an end view along the B-B line shown in FIG. 9A after the airbag is deployed.

MODE FOR CARRYING OUT THE INVENTION

According to the conventional side airbag device, it is difficult to increase a degree of freedom in changing a thickness of each chamber without changing the control performance of the outer shape of the airbag.

According to the present invention, a length of a first inner tether that connects an end of a front side of a front chamber and a first partition wall is specified below. As a result, the above problems can be solved.

That is, according to the present invention, the length of the first inner tether is shorter than a length between a first joint part connecting a first partition wall to the first inner tether and an end of a front side of the front chamber in the airbag having a state prior to the deployment of the airbag in the front to rear vehicle (longitudinal) direction.

Embodiments

The present invention will be explained with reference to the attached drawings below.

Figure 1A:
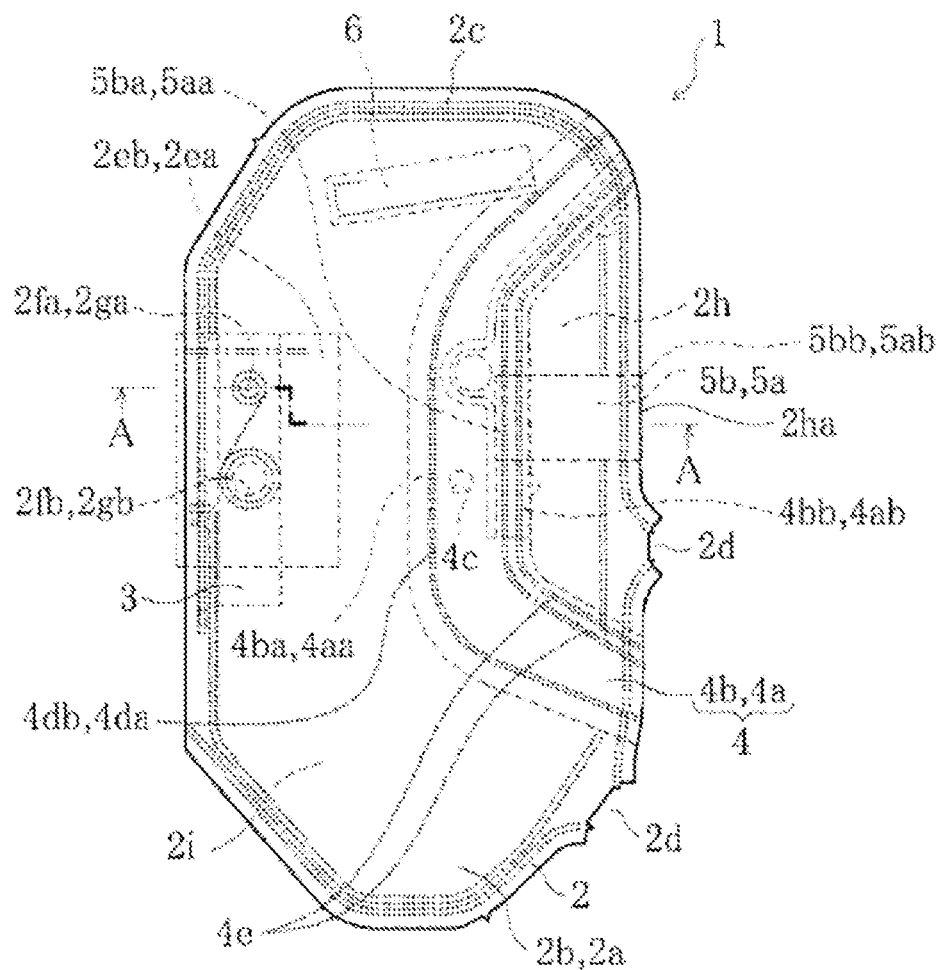
FIGS. 1A and 1B are views that show a side airbag device according to a first embodiment of the present invention.

First Embodiment: FIGS. 1 and 2

A side airbag device 1 of the present invention is provided within a side of a seat back located at, for instance, a side being opposite to a side door of a vehicle.

This side airbag device 1 has an airbag 2 and an inflator 3. Specifically, the inflator 3 generates a gas by receiving an output signal from a sensor that detects an impact in a side collision or in a roll-over and jets the gas into the airbag 2.

Further, the inflator 3 is attached to the inside of the airbag 2 at a rear end side of airbag 2 that is in a state of the deployment and makes the airbag 2 to be deployed in a front direction of the vehicle, for instance, between the side door and the seat of the vehicle in a side collision or a roll-over.

The inflator 3, for instance, in a cylindrical shape and has a configuration so as to jet the gas into the airbag 2 from an injection hole being provided on the outside surface of the inflator 3. For instance, two stud bolts for fixing project at a suitable interval in a longitudinal direction from the outside surface of the inflator 3. By using these stud bolts, the inflator 3 is installed on a frame of the seat back.

Meanwhile, the airbag 2 is formed in a state in which its length in a vertical (up and down) direction is longer than its length in the front to rear vehicle direction and is formed in a bag shape so as to have a thickness in a vehicle width direction as a configuration. In the first embodiment, for instance, a main base cloth 2a located at a vehicle inner side and a main base cloth 2b located at a vehicle outer side are made from a single piece of the base cloth that is arranged in line symmetry with respect to an rear end and are formed in a bag shape by bending the base cloth and connecting an outer edge (a periphery) part by sewing. Further, an outer circumferential joint part 2c connects the outer circumferential parts of the main base cloths 2a and 2b located at the vehicle inner side and the vehicle outer side by, for instance, sewing.

This airbag 2 has a vent hole 2d for exhausting an internal gas so as to obtain an appropriate cushioning property. In the first embodiment, a part of the outer circumferential joint part 2c explained above is discontinuous so that the vent hole 2d is formed.

Further, at the installing part of the inflator 3, for instance, two of reinforcement cloths 2ea and two of reinforcement cloths 2eb are provided. Further, holes 2fa and 2fb and holes 2ga and 2gb, through which stud bolts of the inflator 3 pass through, are provided at the main base cloth 2a located at the vehicle inner side and the reinforcement cloths 2ea, respectively.

In the first embodiment, for instance, a first partition wall 4 that is configured with two of cloth materials (members) 4a and 4b being formed in the same shape is provided at an inside of the airbag 2 being formed in the bag shape, and this first partition wall 4 partitions the airbag 2 into a front chamber 2h and a rear chamber 2i. Specifically, the front chamber 2h is located at the front side and the rear chamber 2i is located at the rear side. In the first partition wall 4, vent holes 4c that introduce the gas being jetted into the rear chamber 2i from the inflator 3 into the front chamber 2h is provided.

Two of the cloth materials 4a and 4b explained above have the size and the shape for dividing the airbag 2 into the front chamber 2h that is mainly capable to restrain a head of the occupant and the rear chamber 2i that is mainly capable to restrain nearby parts such as a chest and a shoulder of the occupant. In the first embodiment, a length in the vertical direction of the cloth materials 4a and 4b is substantially ⅔ of a length in the vertical direction of the airbag 2. A length in the longitudinal direction of the cloth materials 4a and 4b is substantially ½ of a length in the longitudinal direction of the airbag 2. Each of the cloth materials 4a and 4b has a shape that is formed by recessing a base of a substantially trapezoid shape.

Further, one ends (ends at the rear side) 4aa and 4ba of the cloth materials 4a and 4b are respectively connected to the intermediate portions in the longitudinal direction of the main base cloths 2a and 2b located at the vehicle inner side and the vehicle outer side by, for instance, sewing. On the other hand, the other ends (ends at the front side) 4ab and 4bb of the cloth materials 4a and 4b are connected to each other by, for instance, sewing. Further, this connected other ends 4ab and 4bb are connected to one ends (ends at the rear side) 5aa and 5ba of two first inner tethers 5a and 5b at, for instance, the intermediate portion of the front chamber 2h in the vertical direction by, for instance, sewing. The other ends (ends at the front side) 5ab and 5bb of these two first inner tethers 5a and 5b are connected to an end part 2ha (referred to as "a front end part" below) located at the front side of the front chamber 2h.

Joint parts 4da and 4db connect between the one ends 4aa and 4ba of the cloth materials 4a and 4b and the main base cloths 2a and 2b located at the vehicle inner side and the vehicle outer side, respectively. Further, a joint part 4e (referred to as "a first joint part" below) integrally connects between the other ends 4ab and 4bb of the cloth materials 4a and 4b and the one ends 5aa and 5ba of the first inner tethers 5a and 5b.

In the present invention, the lengths of the first inner tethers 5a and 5b are shorter than the length in the longitudinal direction between the above-mentioned first joint part 4e and the front end part 2ha of the front chamber 2h in the airbag 2 having a state prior to the deployment of the airbag 2 (before the airbag 2 is deployed). The first joint part 4e is a joint part connecting between the first partition wall 4 and the first inner tethers 5a and 5b.

Further, an inner baffle 6 shown in FIG. 1 is connected to an upper part within the rear chamber 2i by, for instance, sewing and adjusts the thickness of the rear chamber 2i when the airbag 2 is deployed.

Figure 1B:
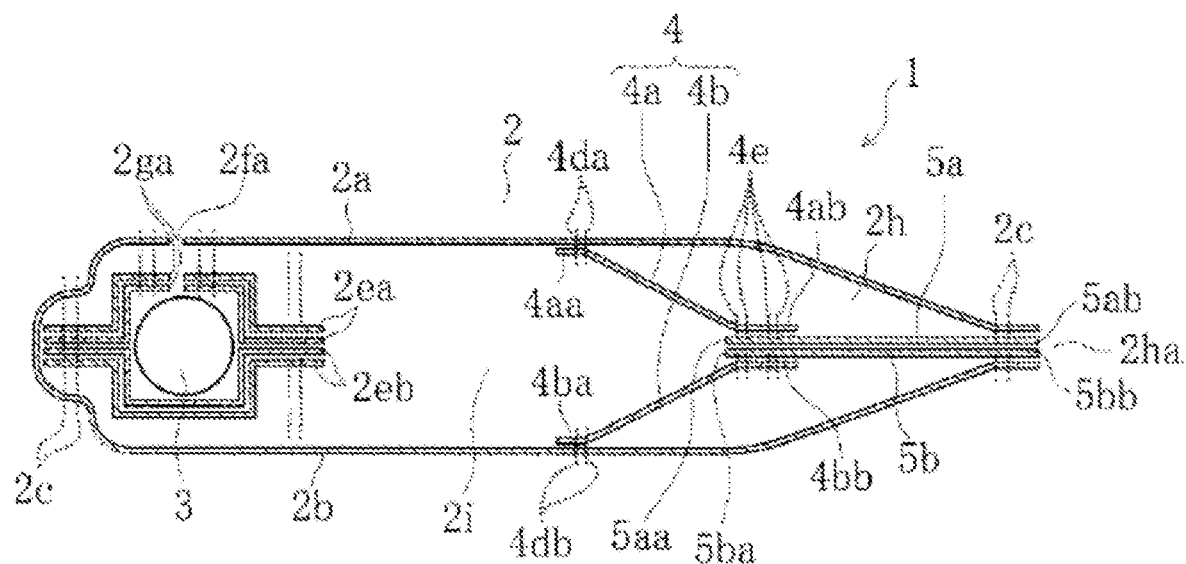
Figure 2A:
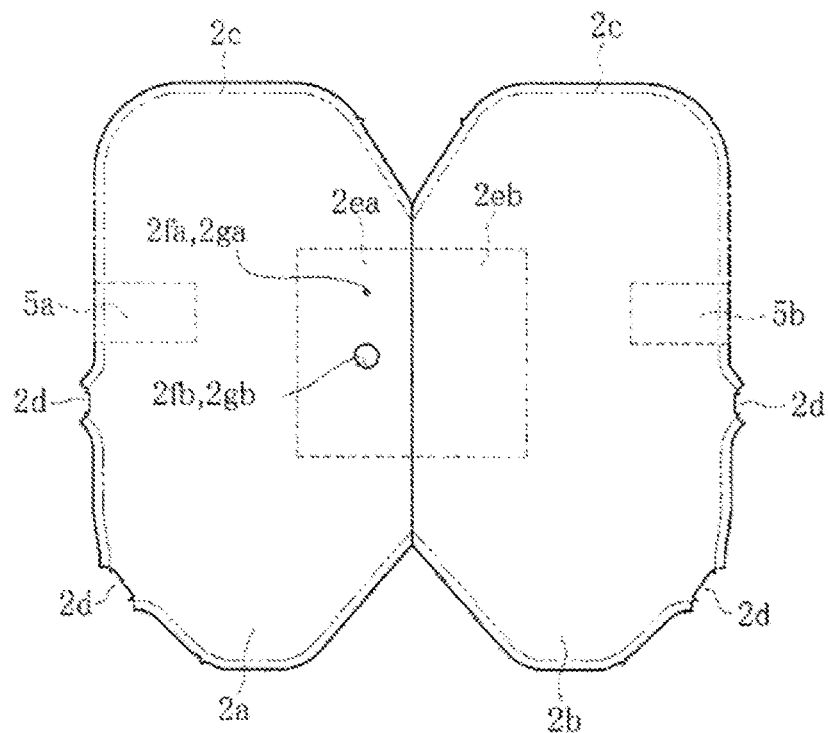
FIGS. 2A-2C are views that show components of the side airbag device according to the first embodiment of the present invention.
Figure 2B:
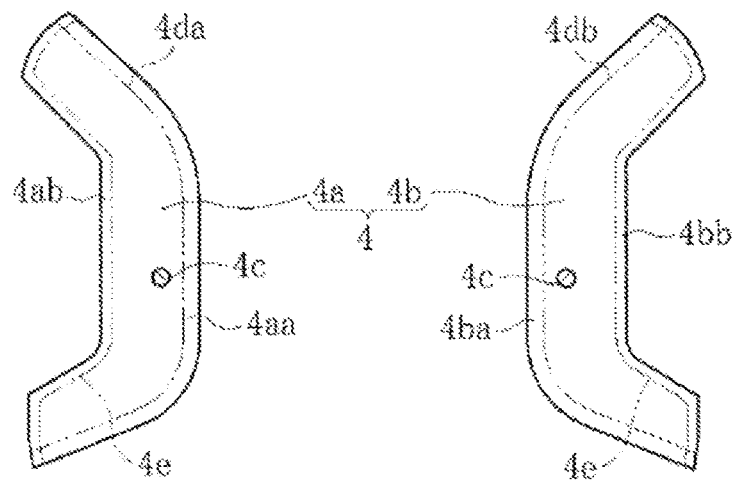
Figure 2C:

In the side airbag device 1 having the configuration explained above, when the airbag 2 is deployed, the intermediate portion (the first joint part 4e being connected to the first inner tethers 5a and 5b) in the vehicle width direction of the first partition wall 4 projects toward the front side in the front chamber 2h as shown in FIG. 1B. Therefore, the control of the outer shape in the longitudinal direction of the airbag 2 can be easily performed. In addition, by changing the lengths of the first inner tethers 5a and 5b, the thickness of the front chamber 2h at the time of the deployment of the airbag can be changed.

Further, in the first embodiment, as shown in FIG. 1A, the first inner tethers 5a and 5b are arranged at the intermediate portion in the vertical direction of the front chamber 2h. Therefore, when the airbag 2 is deployed, the thickness of the front chamber 2h become uniform in the vertical direction.

Further, the other ends 4ab and 4bb of the two cloth materials 4a and 4b of the first partition wall 4 and the one ends 5aa and 5ba of the two first inner tethers 5a and 5b are connected (the first joint part 4e). Therefore, when the airbag 2 is deployed, the thickness of the front chamber 2h can be linear symmetry in the vehicle width direction.

Figure 3A:
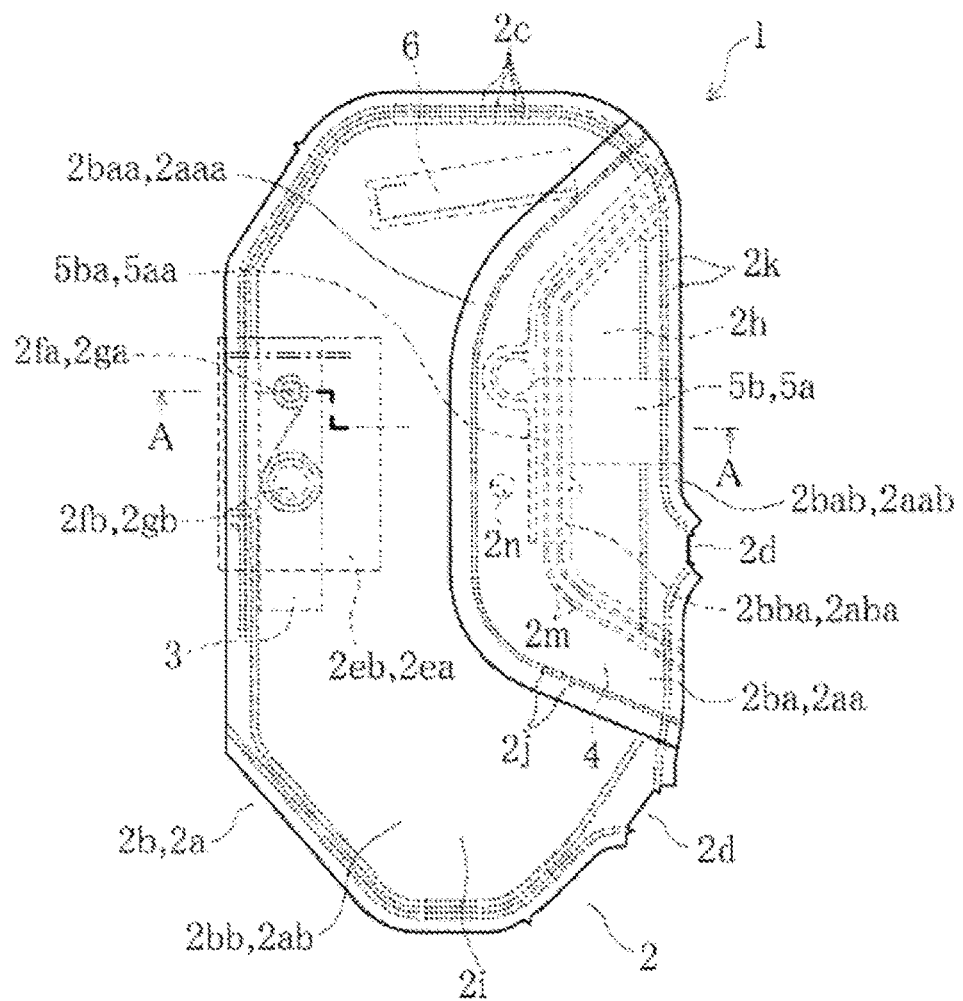
FIGS. 3A and 3B are views that show a side airbag device according to a second embodiment of the present invention.
Figure 3B:
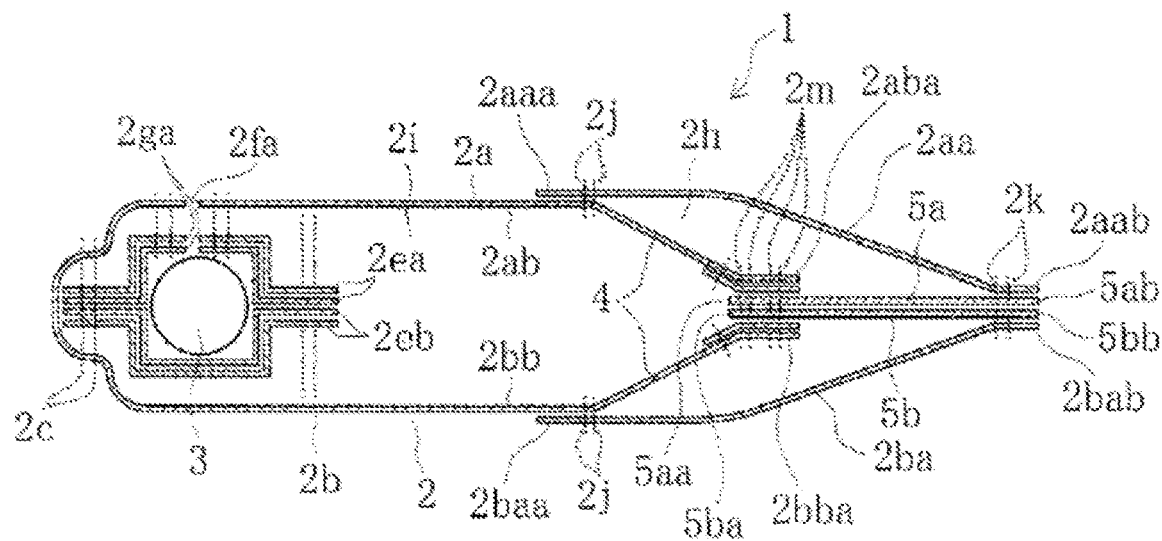
Figure 4A:
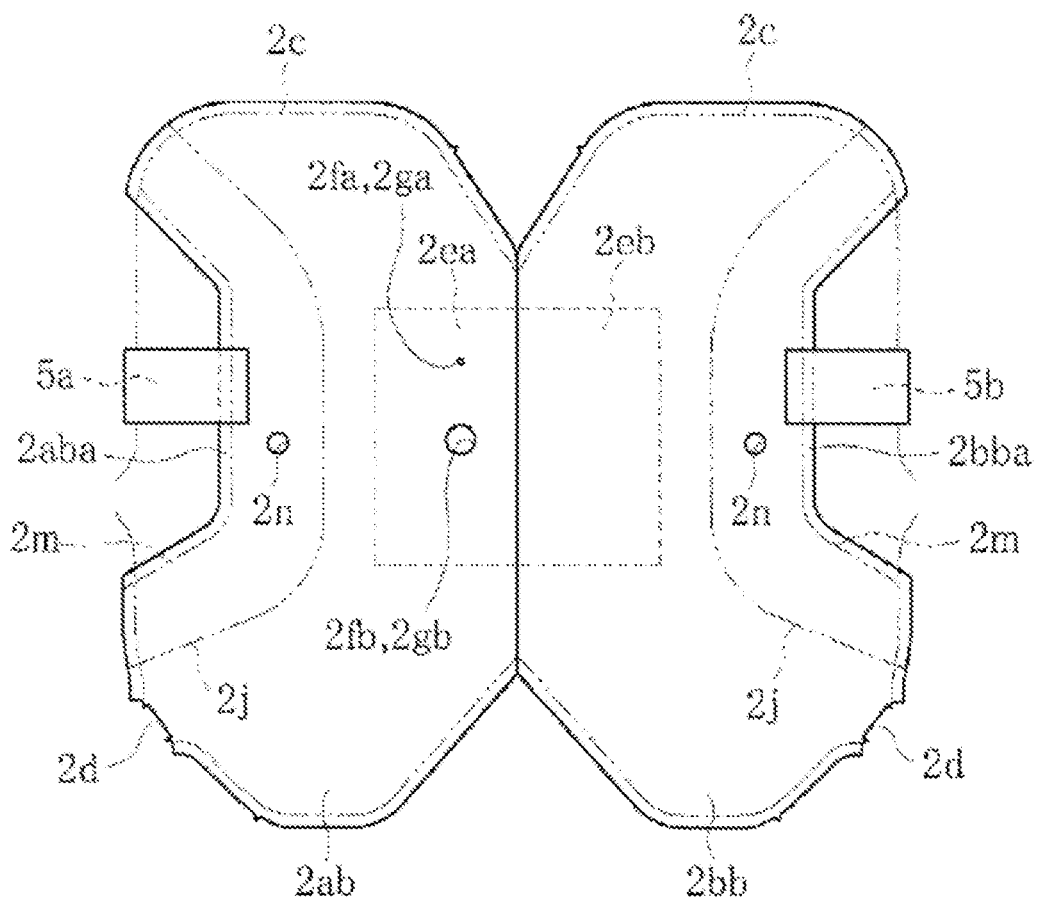
FIGS. 4A and 4B are views that show components of the side airbag device according to the second embodiment of the present invention.
Figure 4B:
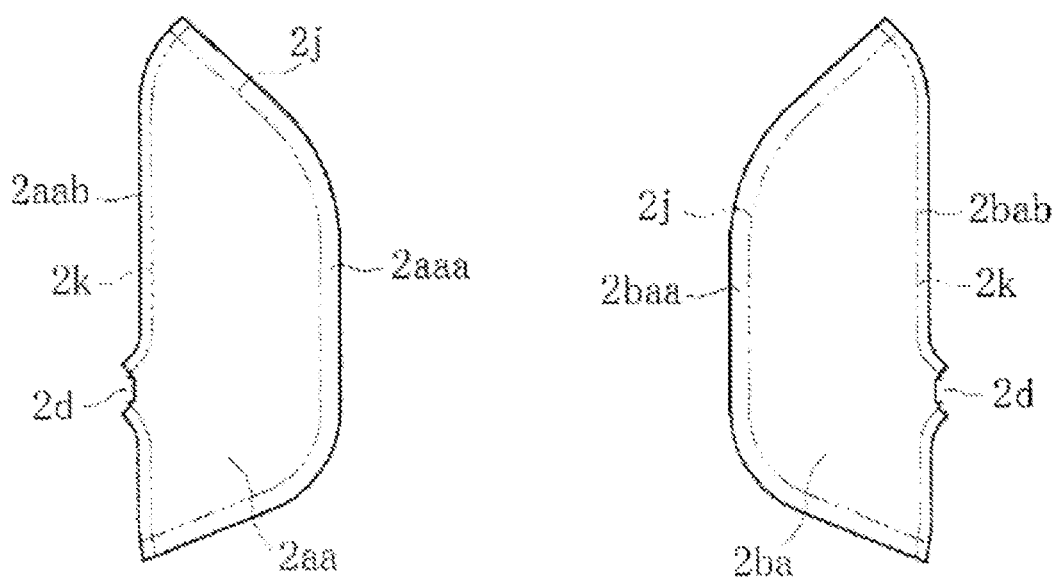

Second Embodiment: FIGS. 3 and 4

In a second embodiment, the main base cloths 2a and 2b located at the vehicle inner side and the vehicle outer side that form the airbag 2 are configured with, for instance, first base cloths 2aa and 2ba being located at the front side and second base cloths 2ab and 2bb being located at the rear side. In this second embodiment, the above-mentioned second base cloths 2ab and 2bb has a shape in which the intermediate portion at the front side in the vertical direction is recessed toward the rear side so that the recessed part is in a substantially trapezoid shape. Further, the above-mentioned first base cloths 2aa and 2ba have a shape for covering an area that is recessed of the second base cloths 2ab and 2bb explained above.

Further, one ends 2aaa and 2baa of the first base cloths 2aa and 2ba are connected to the outer sides, with which one peripheries of the first base cloths 2aa and 2ba having the above-mentioned shape are overlapped, of the second base cloths 2ab and 2bb having the above-mentioned shape at the intermediate portions in the longitudinal direction by, for instance, sewing. Further, other ends 2aab and 2bab of these first base cloths 2aa and 2ba are connected to each other by, for instance, sewing so as to be formed in the bag shape.

2j shows a joint part (referred to as "a second joint part" below) of the above-mentioned second base cloths 2ab and 2bb and the one ends 2aaa and 2baa of the first base cloths 2aa and 2ba. Further, 2k shows a joint part of the other ends 2aab and 2bab of the first base cloths 2aa and 2ba.

As long as the airbag 2 can be formed in the bag shape by connecting the first base cloths 2aa and 2ba and the second base cloths 2ab and 2bb by, for instance, sewing, the shapes of the first base cloths 2aa and 2ba and the second base cloths 2ab and 2bb are not limited to the shapes shown in FIG. 4 explained above.

In this case, the above-mentioned first partition wall 4 corresponds to the front side portions of the second base cloths 2ab and 2bb that are located at the front side than the above-mentioned second joint part 2j being connected to the one ends 2aaa and 2baa of the first base cloths 2aa and 2ba. Further, ends 2aba and 2bba located at the front side of the second base cloths 2ab and 2bb are connected to each other by, for instance, sewing, and such joint part 2m (a third joint part) and the joint part 2k, which connects between the other ends 2aab and 2bab of the first base cloths 2aa and 2ba, are connected by the first inner tethers 5a and 5b.

In this second embodiment, vent holes 2n are provided in the front side portions of the second base cloths 2ab and 2bb corresponding to the first partition wall 4 located at the front side than the second joint part 2j being connected to the one ends 2aaa and 2baa of the first base cloths 2aa and 2ba.

In the second embodiment, only the above-mentioned configurations are different, and, however, other configuration and the effect are the same as the first embodiment.

Figure 5A:
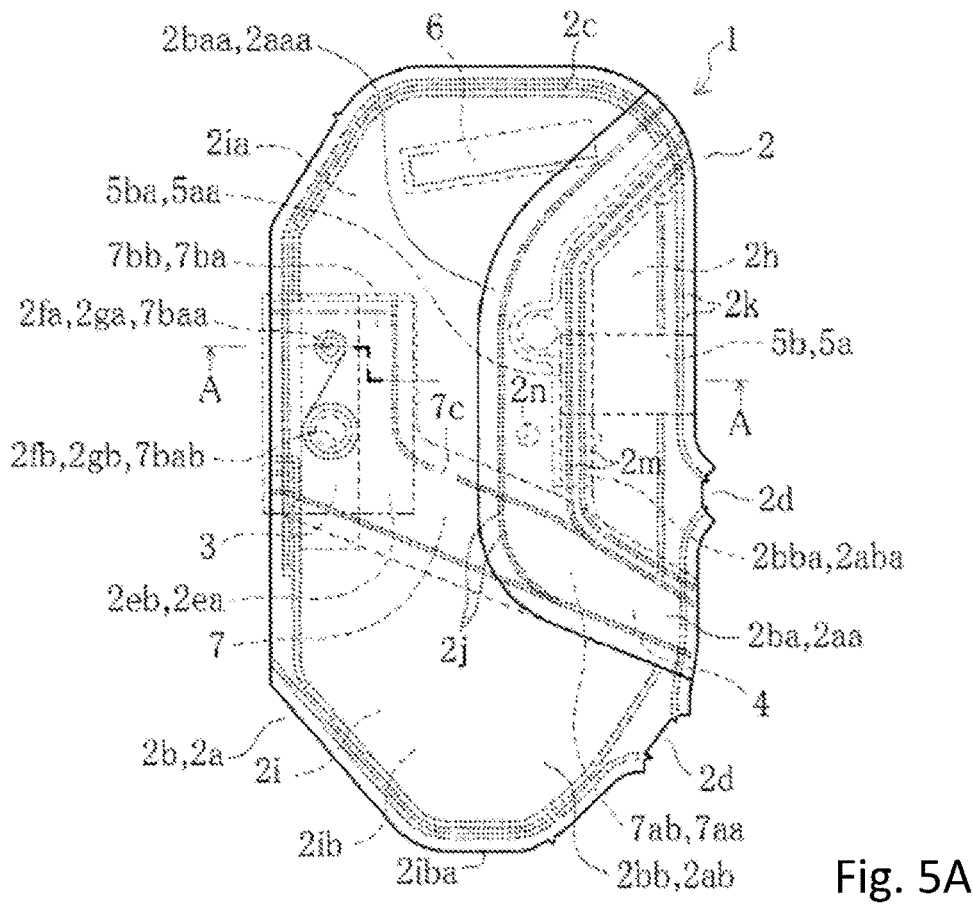
FIGS. 5A and 5B are views that show a side airbag device according to a third embodiment of the present invention.
Figure 5B:
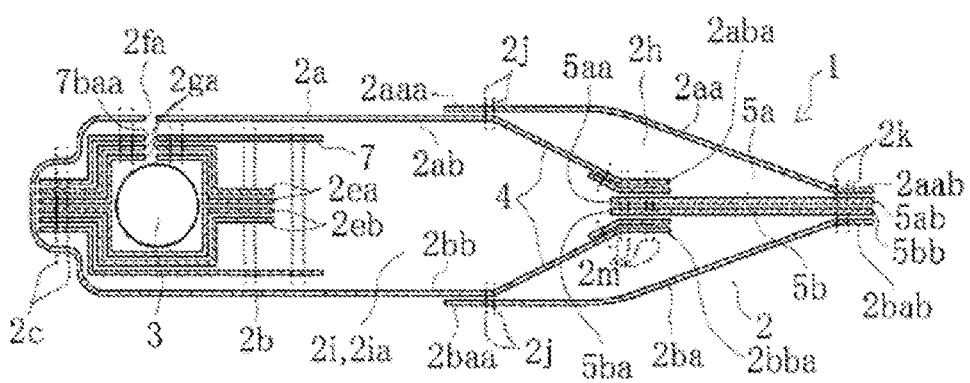
Figure 6:
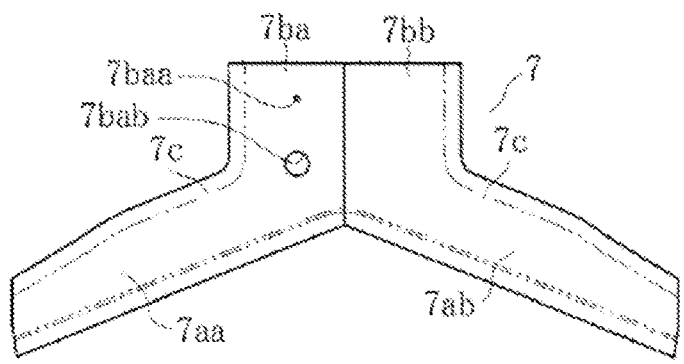
FIG. 6 is a view that shows a second partition wall that is a component of the side airbag device according to the third embodiment of the present invention.

Third Embodiment: FIGS. 5 and 6

In a third embodiment, for instance, a second partition wall 7 is provided at an inside of the rear chamber 2i of the second embodiment and this second partition wall 7 partitions the rear chamber 2i into an upper rear chamber 2ia and an lower rear chamber 2ib. In this third embodiment, a restraining portion for the occupant by the rear chamber 2i can be subdivided.

In FIG. 6, the above-mentioned second partition wall 7 has band-shaped cloths 7aa and 1ab in which rear ends have cover parts 7ba and 7bb that cover the outer circumference surface of the inflator 3. The band-shaped cloths 7aa and 7ab are formed by upwardly inclining from the front toward the rear of the second base cloths 2ab and 2bb. Further, the holes 7baa and 7bab, through which the stud volts of the inflator 3 pass, are also provided at the cover part 7ba.

The second partition wall 7 shown in FIG. 6 partitions the rear chamber 2i into the upper rear chamber 2ia and the lower rear chamber 2ib by integrally connecting between lower end parts of the band-shaped cloths 7aa and 7ab and the second base cloths 2ab and 2bb by, for instance, sewing.

Further, a baffle is formed by connecting upper end parts of the band-shaped cloths 7aa and 7ab each other by, for instance, sewing. Meanwhile, front end parts of the cover parts 7ba and 7bb are connected by, for instance, sewing to cover the inflator 3.

In this third embodiment, a part of the joint part of the upper end parts of the band-shaped cloths 7aa and 7ab of the second partition wall 7 is discontinuous so that a vent hole 7c is provided.

With respect to the shape of the second partition wall 7, as long as the rear chamber 2i can be divided into the upper rear chamber 2ia and the lower rear chamber 2ib, the cover parts 7ba and 7bb are not always needed.

In the third embodiment, only the above-mentioned configuration and the effect based on this configuration are different, and however, other configuration and the effect are the same as the second embodiment.

Fourth Embodiment: FIGS. 7 and 8

In a fourth embodiment, the shape of the above-mentioned second partition wall 7 is different from the third embodiment.

That is, as shown in FIG. 8, this second partition wall 7 has a notched part 7d for the insertion of the inflator 3 at an end part of the rear side of a band-shaped cloth 7a that is formed by upwardly inclining from the front toward the rear of the second base cloths 2ab and 2bb.

The second partition wall 7 shown in FIG. 8 partitions the rear chamber 2i into the upper rear chamber 2ia and the lower rear chamber 2ib and at the same time, forms a baffle by connecting the both end parts in the vehicle width direction of the band-shaped cloth 7a to the second base clothes 2ab and 2bb by, for instance, sewing. Joint parts 7e are joint parts connecting between the band-shaped cloth 7a and the second base cloths 2ab and 2bb.

In this fourth embodiment, a vent hole 7c is provided at the center part in the vehicle width direction of the band-shaped cloth 7a of the second partition wall 7.

In the fourth embodiment, only the above-mentioned configuration is different, and however, other configuration and the effect are the same as the third embodiment.

Figures 9A, 9B:
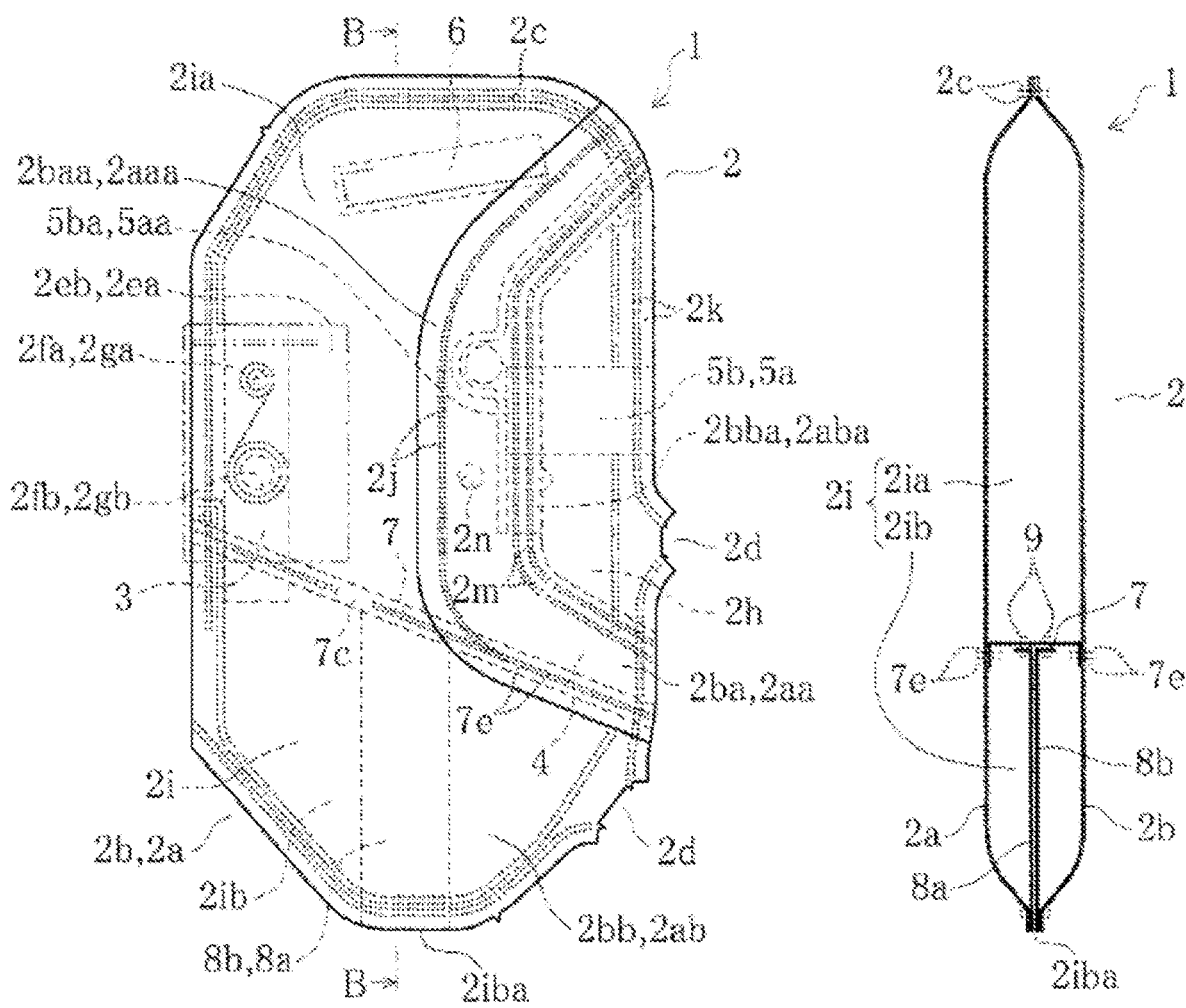
FIGS. 9A and 9B are views that show a side airbag device according to a fifth embodiment of the present invention.
Figure 10:
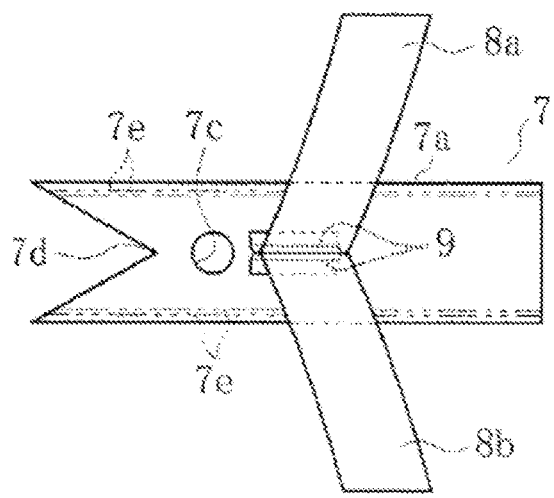
FIG. 10 shows a third example of the second partition wall that is the component of the side airbag device according to the fifth embodiment of the present invention.

Fifth Embodiment: FIGS. 9 and 10

In a fifth embodiment, for instance, two second inner tethers 8a and 8b are provided at a position of the above-mentioned second partition wall 7 corresponding to the intermediate portion in the longitudinal direction of the lower rear chamber 2ib so as to connect between an lower side end part 2iba of the lower rear chamber 2ib and the second partition wall 7.

Further, the lengths in the vertical direction of these second inner tethers 8a and 8b are shorter than a length between a joint part 9 (a fourth joint part) connecting between the second partition wall 7 and the second inner tethers 8a and 8b and the lower side end part 2iba of the lower rear chamber 2ib in the airbag 2 having a state prior to the deployment of the airbag 2.

In this fifth embodiment, in addition to the effect of the fourth embodiment, when the airbag 2 is deployed, the control of the outer shape in the vertical direction of the lower rear chamber 2ib can be easily performed. Further, by changing the lengths of the second inner tethers 8a and 8b, the thickness of the lower rear chamber 2ib at the time of the deployment of the airbag can be changed.

The present invention is not limited to the above described examples. It will be apparent to modify the embodiments accordingly so long as such modifications are within the scope of technical idea described in the claims.

Specifically, the above-described side airbag devices are preferred examples of the present invention. Thus, other embodiments can also be carried out in various ways. Unless there is a limited description in the specification, the present invention should not be limited to the detailed shape, size, configuration, and arrangement of parts shown in the attached drawings. Further, the expressions and terms used in the specification are for illustrative purposes. Thus, unless there is a limited description, the same are not limited thereto.

For instance, in the embodiments explained above, the examples in which two of the first inner tethers 5a and 5b and two of the second inner tethers 8a and 8b are provided in the vehicle width direction are shown. However, one or more than three can also be provided in the vehicle width direction.

Further, in the embodiments explained above, the main base cloth 2a located at the vehicle inner side and the main base cloth 2b located at the vehicle outer side, or the second base cloths 2ab and 2bb are formed to be one piece of cloth. However, each of the main base cloth 2a located at the vehicle inner side and the main base cloth 2b located at the vehicle outer side, and the second base cloths 2ab and 2bb is also formed by a different piece of an individual cloth.

Further, in the embodiments explained above, two of the reinforcement cloths 2ea and 2eb are provided. However, as long as the main base cloth 2a located at the vehicle inner side and the main base cloth 2b located at the vehicle outer side, and the second base cloths 2ab and 2bb can be protected from heat that is generated by the inflator 3 when the gas is jetted, there is no restriction on the number.

Further, in the embodiments explained above, it is explained that the side airbag device 1 of the present invention is installed within the side of the seat back located at the side door. However, the present invention can also be applied to the installation within a side, which is located at a side of the adjacent seat, of the seat back.

Further, in the embodiments explained above, all of the joint parts are achieved by sewing. However, as long as a predetermined strength can be secured, the connection is not limited by sewing.

1 side airbag device
   2 airbag
   2a main base cloth located at vehicle inner side
   2aa first base cloth
   2aaa one end
   2aab the other end
   2ab second base cloth
   2b main base cloth located at vehicle outer side
   2ba first base cloth
   2baa one end
   2bab the other end
   2bb second base cloth
   2c outer circumferential joint part
   2h front chamber
   2ha front end part
   2i rear chamber
   2ia upper rear chamber
   2ib lower rear chamber
   2iba lower side end part
   2j second joint part
   2m third joint part
   3 inflator
   4 first partition wall
   4a, 4b cloth materials
   4aa, 4ba one ends
   4ab, 4bb the other ends
   4e first joint part
   5a, 5b first inner tethers
   5aa, 5ba one ends
   7 second partition wall
   7a, 7aa, lab band-shaped cloths
   7ba, 7bb cover part 7d notched part
8a, 8b second inner tethers
9 fourth joint part

What is claimed is:

1. A side airbag device for deployment from a side of a backrest part of a seat into an area between a side door and the seat or an area between adjacent seats, the side airbag device comprising:
an airbag; and
an inflator that is disposed at a rearward vehicle direction end of the airbag when the airbag is deployed and that generates a gas in response to a signal output from a sensor when a side collision or a roll-over occurs and supplies the gas to the airbag in a folded state so as to deploy the airbag,
wherein the airbag is formed in a bag shape by connecting a periphery of a main base cloth of a vehicle inner side and a periphery of a main base cloth of a vehicle outer side,
an inside of the airbag formed in the bag shape, the airbag includes:
a first partition wall partitioning the inside into at least a front chamber located at a forward vehicle direction end of the airbag and a rear chamber located at the rearward vehicle direction end of the airbag at a time of deployment of the airbag; and
a first inner tether connecting between a forward vehicle direction end of the front chamber and the first partition wall in the front chamber, and
a first length of the first inner tether is shorter than a second length between a first joint part connecting the first partition wall to the first inner tether and the forward vehicle direction end of the front chamber in a front to rear vehicle direction before the airbag is deployed.

2. The side airbag device according to claim 1, wherein an intermediate portion of the first partition wall in a vehicle width direction is provided to protrude in a forward vehicle direction at a time of the deployment of the airbag, and
an intermediate portion in a vehicle height direction of the first partition wall in the protruded state is the first joint part.

3. The side airbag device according to claim 1, wherein the first partition wall has at least two cloth members, and
wherein a first end of each of the at least two cloth members at a rearward vehicle direction end connects intermediate portions in the front to rear vehicle direction of the main base cloths of the vehicle inner side and the vehicle outer side, respectively, and a second end of each of the at least two cloth members at a forward vehicle direction end connect a rearward vehicle direction end of the first inner tether.

4. The side airbag device according to claim 1, wherein each of the main base cloths of the vehicle inner side and the vehicle outer side includes a first base cloth located at a forward vehicle direction end and a second base cloth located at a rearward vehicle direction end, and a rearward vehicle direction end of each of the first base cloths is located at an outside of an intermediate portion of each of the second base cloths in the front to rear vehicle direction so as to overlap each of the second base cloths, and each of the rearward vehicle direction ends and each of the intermediate portions are connected by a second joint part so that the main base cloths of the vehicle inner side and the vehicle outer side are formed,
the first partition wall is formed by connecting forward vehicle direction ends of parts of the second base cloths located at the forward vehicle direction end with respect to the second joint part by a third joint part,
the front chamber is formed by the first base cloths and the first partition wall, and the rear chamber is formed by the second base cloths, and
the first inner tether connects between the third joint part and the other forward vehicle direction ends of the first base cloths that form the front chamber.

5. The side airbag device according to claim 1, wherein the second base cloths of the vehicle inner side and the vehicle outer side have configurations in which intermediate portions in a vehicle height direction at the forward vehicle direction end recess toward the rearward vehicle direction end, and
the first base cloths of the vehicle inner side and the vehicle outer side have configurations to cover areas of the recessed configurations.

6. The side airbag device according to claim 1, wherein the first inner tether is arranged at an intermediate portion in a vehicle height direction of the front chamber.

7. The side airbag device according to claim 1, wherein the first inner tether is formed with at least two of the first inner tethers.

8. The side airbag device according to claim 6, wherein the first inner tether is formed with at least two of the first inner tethers.

9. The side airbag device according to claim 1, wherein the airbag has a second partition wall in the rear chamber that partitions the rear chamber into an upper rear chamber and a lower rear chamber.

10. The side airbag device according to claim 6, wherein the airbag has a second partition wall in the rear chamber that partitions the rear chamber into an upper rear chamber and a lower rear chamber.

11. The side airbag device according to claim 7, wherein the airbag has a second partition wall in the rear chamber that partitions the rear chamber into an upper rear chamber and a lower rear chamber.

12. The side airbag device according to claim 9, wherein the second partition wall is a band-shaped cloth that is upwardly inclined from the forward vehicle direction end to the rearward vehicle direction end of the main base cloth of the vehicle inner side and the main base cloth of the vehicle outer side, and
the second partition wall has a configuration having a cover part at a rearward vehicle direction end, and the cover part covers an outer circumference surface of the inflator.

13. The side airbag device according to claim 10,
wherein the second partition wall is a band-shaped cloth that is upwardly inclined from the forward vehicle direction end to the rearward vehicle direction end of the main base cloth of the vehicle inner side and the main base cloth of the vehicle outer side, and
the second partition wall has a configuration having a cover part at a rearward vehicle direction end, and the cover part covers an outer circumference surface of the inflator.

14. The side airbag device according to claim 9, wherein the second partition wall is a band-shaped cloth that is upwardly inclined from the forward vehicle direction end to the rearward vehicle direction end of the main base cloth of the vehicle inner side or the main base cloth of the vehicle outer side, and
the second partition wall has a notched part for inserting the inflator at a rearward vehicle direction end.

15. The side airbag device according to claim 10,
wherein the second partition wall is a band-shaped cloth that is upwardly inclined from the forward vehicle direction end to the rearward vehicle direction end of the main base cloth of the vehicle inner side or the main base cloth of the vehicle outer side, and the second partition wall has a notched part for inserting the inflator at a rearward vehicle direction end.

16. The side airbag device according to claim 9, wherein in the lower rear chamber, a second inner tether is provided to connect between a vehicle floor direction end of the lower rear chamber and the second partition wall, and a length of the second inner tether is shorter than a length between a fourth joint part connecting the second partition wall to the second inner tether and the vehicle floor direction end of the lower rear chamber in the airbag before the airbag is deployed.

17. The side airbag device according to any claim 10,
wherein in the lower rear chamber, a second inner tether is provided to connect between a vehicle floor direction end of the lower rear chamber and the second partition wall, and a length of the second inner tether is shorter than a length between a fourth joint part connecting the second partition wall to the second inner tether and the vehicle floor direction end of the lower rear chamber in the airbag before the airbag is deployed.

18. The side airbag device according to claim 13, wherein in the lower rear chamber, a second inner tether is provided to connect between a vehicle floor direction end of the lower rear chamber and the second partition wall, and a length of the second inner tether is shorter than a length between a fourth joint part connecting the second partition wall to the second inner tether and the vehicle floor direction end of the lower rear chamber in the airbag before the airbag is deployed.

19. The side airbag device according to claim 15, wherein in the lower rear chamber, a second inner tether is provided to connect between a vehicle floor direction end of the lower rear chamber and the second partition wall, and a length of the second inner tether is shorter than a length between a fourth joint part connecting the second partition wall to the second inner tether and the vehicle floor direction end of the lower rear chamber in the airbag before the airbag is deployed.

20. The side airbag device according to claim 16,
wherein the second inner tether is arranged at an intermediate portion of the lower rear chamber in the front to rear vehicle direction.

21. The side airbag device according to claim 17, wherein the second inner tether is arranged at an intermediate portion of the lower rear chamber in the front to rear vehicle direction.

22. The side airbag device according to claim 16, wherein the second inner tether is formed with at least two of the second inner tethers.

23. The side airbag device according to claim 17, wherein the second inner tether is formed with at least two of the second inner tethers.

24. The side airbag device according to claim 20, wherein the second inner tether is formed with at least two of the second inner tethers.

* * * * *